United States Patent [19]
Hoult et al.

[11] Patent Number: 5,323,149

[45] Date of Patent: Jun. 21, 1994

[54] DATA COMMUNICATIONS METHOD WITH TWO WAY COMMUNICATION BETWEEN MASTER AND SLAVE TRANSCEIVERS

[75] Inventors: Nigel S. Hoult; Geoffrey J. A. Baddoo, both of Reading, England

[73] Assignee: The Racal Corporation Canada Inc., Mississauga, Canada

[21] Appl. No.: 802,166

[22] Filed: Dec. 4, 1991

[30] Foreign Application Priority Data

Dec. 4, 1990 [GB] United Kingdom ............... 9026347

[51] Int. Cl.$^5$ .............................................. H04B 7/00
[52] U.S. Cl. .............................. 340/825.54; 340/825.5
[58] Field of Search ........... 340/825.5, 825.51, 825.52, 340/825.54; 370/85.2, 94.1, 85.1, 85.3, 85.6, 95.2

[56] References Cited

U.S. PATENT DOCUMENTS

| | | | |
|---|---|---|---|
| 4,598,285 | 7/1986 | Hoshen | 340/825.5 |
| 4,745,596 | 5/1988 | Sato | 340/825.51 |
| 4,868,816 | 9/1989 | Katsumata et al. | 370/95.2 |
| 5,012,467 | 4/1991 | Crane | 340/825.5 |
| 5,151,693 | 9/1992 | Onoe et al. | 340/825.54 |

Primary Examiner—Donald J. Yusko
Assistant Examiner—John E. Giust
Attorney, Agent, or Firm—Anna E. Mack

[57] ABSTRACT

A data communications system, e.g. for "hands free" personnel location or access control, comprises a master transceiver and a plurality of slave transceivers for transmitting individual identification messages to the master in accordance with a code in which binary values are represented by an infra-red transmission occurring during a first portion or a second portion of a bit period respectively. The master alternately echoes back to the slaves a binary value corresponding to the value last received. In the event of a clash, however, i.e. different values transmitted from different slaves during the same bit period, the master echoes back only a predetermined single value and the slave(s) which did not transmit that value then cease transmission. This process continues until one of the slaves has transmitted and had echoed back bit-by-bit the whole of its message. That slave then ceases transmission and the remaining slaves recommence until by repetition of the process all of the individual slave messages have been transmitted and echoed back.

7 Claims, 2 Drawing Sheets

DATA COMMUNICATIONS METHOD WITH TWO WAY COMMUNICATION BETWEEN MASTER AND SLAVE TRANSCEIVERS

BACKGROUND

The present invention relates to data communications and more particularly concerns a communication protocol designed to resolve clashes in a system where a plurality of separate devices (termed herein "slaves") may attempt to communicate simultaneously with another device (termed herein "master") over a common communication channel.

One field of "master and slaves" communication with which the invention is particularly concerned is a so-called "hands-free" access control system. In such a system the "slaves" comprise individual tokens worn or carried by different persons and capable of trasmitting respective identifiction codes to "master" control units associated with doorways in a building, when in the vicinity thereof, so that a control unit can determine if an approaching person is authorised to pass through without requiring the person to request access by means of a specific manipulative action. A similar system can be used for monitoring the whereabouts of persons within a building, e.g. patients within a hospital, where each wears a "slave" token the transmissions of which are received by "master" control units distributed throughout the institution and linked to a central monitoring station. Systems such as these can operate through a variety of communications media, including by way of infra-red, ultrasonic or radio emissions, or inductive or capacitative coupling techniques. In principle, however, the invention is not restricted to any particular field of application or communications medium, and may be found of general utility in resolving clashes between simultaneous slave-to-master transmissions in wireless or wired data communication environments.

Assuming that data is transmitted in binary form, the communication protocol employed in any such system must enable the simultaneous reception of a "0" and a "1" from different slave transmitters to be recognize and resolved. Furthermore, the reception of a "0" or a "1" must still be reliably achieved if a number of slaves simultaneously transmit that same value. The protocol of the present invention is based upon binary coding having the characteristics of the known Manchester II code. In Manchester II code the values "0" and "1" are distinguished not by different high and low logic levels but by the position of a high logic level in either the first half or the second half of a defined bit period. There is therefore a logic transition at the middle of each bit period, the binary value of data being represented by the direction the transition. By way of example, the accompanying FIG. 1 is a representation of the word "10110" in the Manchester II code where a "0" is represented by a high level in the first half of a bit period and a "1" is represented by a high level in the second half; (of course in any particular implementation the definitions of a "0" and a "1" could be exchanged if desired). If such a coding scheme is to be used in a system where two or more slaves transmit different data simultaneously over the same communication channel it will be appreciated that when both a "0" and a "1" are transmitted by different slaves in the same bit period the signal received by the master will be a high level throughout that period and that in the absence of some means of resolving the clash the data will be unreadable. It is to the resolution of such clashing transmissions that the present invention is directed.

SUMMARY OF THE INVENTION

Accordingly the invention resides in a data communication system comprising a master transceiver and a plurality of slave transceivers for transmitting respective messages to the master transceiver in accordance with a code in which binary values are represented by a specified logic level occurring during a first portion or a second portion of a bit period respectively; means for synchronizing the operation of the transceivers such that said slave transceivers transmit the first bit of their respective messages simultaneously and the transmission of bits then alternates between the master and slave transceivers; the master transceiver being adapted to transmit back to the slave transceivers a binary value corresponding to the value last received when it receives only a single binary value (from any number of said slave transceivers) in the preceding bit period, and to transmit back to the slave transceivers a predetermined single binary value when it receives both binary values in the preceding bit period; each slave transceiver being adapted to transmit the next successive bit of its respective message when the last binary value received from the master transceiver corresponds to the preceding bit of its message, but to cease transmission until a subsequent instruction from the master transceiver when the last binary value received from the master transceiver does not so correspond.

In this way clashes between the slave messages are in effect resolved by the master transceiver arbitrarily reading the simultaneous reception of both a "0" and a "1" as only one of those values, say a "1", and returning that value to the slave transceivers. By monitoring the master's transmissions, the slaves know which value has been read by the master and if it was not the one which a particular slave last sent then that slave will cease transmitting. The process will continue bit by bit until only one slave message remains transmitting. The successful slave, knowing that its entire message has been received by monitoring its echo from the master can then remain silent while the whole process is repeated and the other slave messages are received one by one.

An example of the operation of this protocol within a data communication system according to the invention will now be described with reference to FIGS. 2 to 4 of the accompanying drawings.

DETAILED DESCRIPTION

For the purposes of illustration the invention will be described hereinafter in the context of a "hands-free" access control or personnel location system. In this system the persons occupying a particular building each wear a "slave" identification token including a microprocessor programmed with an individual identification code and an infra-red emitter and detector for two-way communication with "master" control or monitoring units distributed throughout the building. Data exchange between the tokens and control units is by way of a binary coding in which a "0" is represented by an infra-red transmission during the first half of a bit period and a "1" is represented by an infra-red transmission during the second half of a bit period. The intention is that each token within range of any control unit should signal its presence by transmitting its individual identification code. Clearly, since there may be any number of tokens within range of a control unit at any one time it is necessary for the communication protocol employed to be capable of resolving clashes between the simultaneous transmissions of different tokens.

Figure 1:
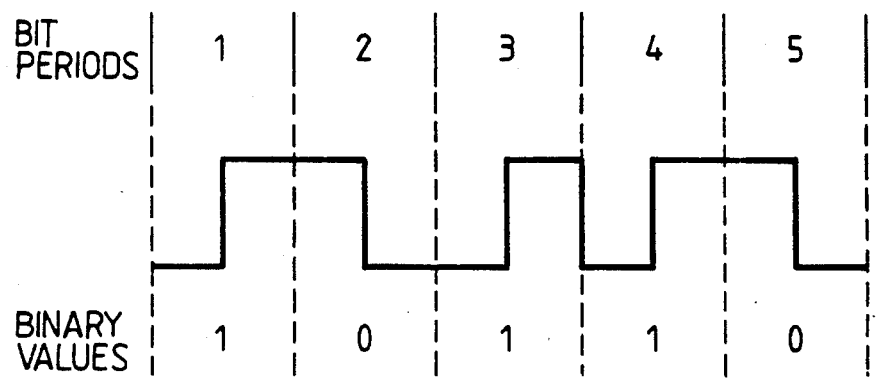
FIG. 1 is a diagram exemplifying the known Manchester II code.
Figure 2:
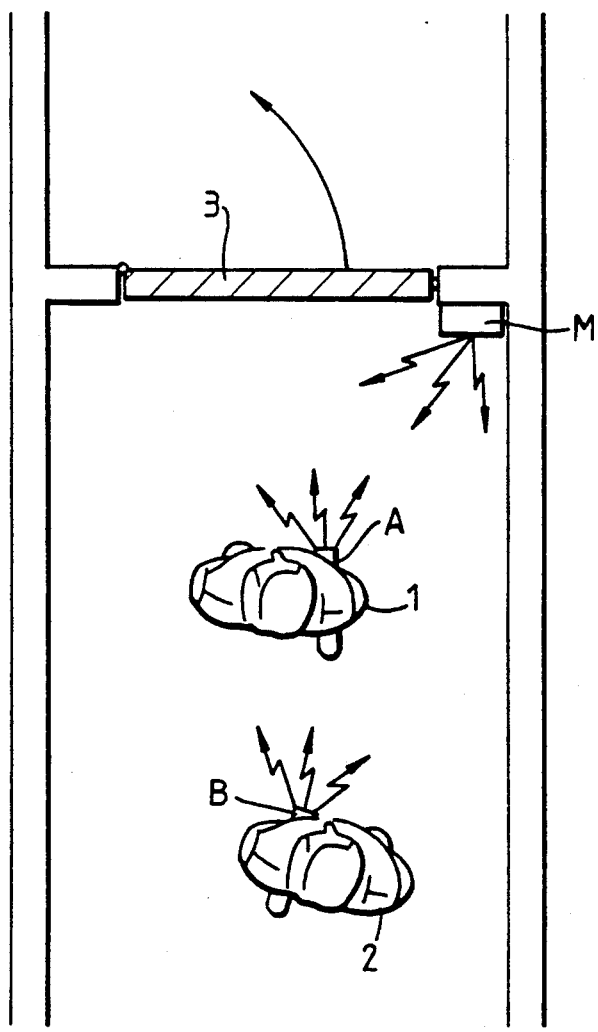
FIG. 2 is a schematic plan view of an environment in which the invention may be utilised.

In the example of FIG. 2, two persons 1 and 2 are seen approaching a doorway 3 in a building and each wears an individually-coded identification token A, B respectively. Associated with the doorway 3 is a control unit M for reading the codes of the tokens worn by persons in its vicinity and relaying these codes to a central monitoring station from which the whereabouts of the respective persons can be identified at any time. The control unit M may additionally or alternatively perform the function of permitting or denying access through the doorway 3 by controlling the locking of its door in accordance with the level of authorisation associated with the identification codes which it reads.

A session of communication commences with the control unit M (i.e. "master") broadcasting a predefined signal which is interpreted by the tokens (i.e. "slaves") which are within its range as an invitation to commence transmission of their identification.. codes. This signal also includes information whereby synchronization of the subsequent data exchanges is maintained. In the simple example depicted in FIGS. 2 and 3 there are only two tokens in range, i.e. slave A and slave B, each with a four-bit code to transmit, say "1010" for slave A and "1001" for slave B. Consequently, on receipt of the invitation signal from the master, both slaves simultaneously transmit the respective first bits of their identification codes, which in this case are both a "1". The master listens for the transmissions from the slaves following its invitation signal and, depending on the compositions of the codes of the slaves in range, it may receive a signal only in the first half of the bit period (i.e. any number of slaves all sending a "0"), a signal only in the second half of the bit period (i.e. any number of slaves all sending a "1") or a signal in both halves of the bit period (i.e. two or more slaves, some sending a "0" and some sending a "1"). In addition, if no slave is in range the master will receive no transmission at all. The master responds by transmitting a signal in the next bit period determined in accordance with the following rules:

| | |
|---|---|
| If a "0" is received: | Send a "0" |
| If a "1" is received: | Send a "1" |
| If both a "0" and a "1" are received: | Send a "1" |
| If nothing is received: | Send another invitation signal. |

In the illustrated example, since both slaves A and B have sent a "1" in bit period 1 the master responds by echoing back a "1" in bit period 2. The slaves all monitor this transmission. If the value they receive back is the one they sent, they proceed to send the next bit of their message. If not, they cease transmission. This means that where two messages differ in a particular bit, the slave(s) which sent a "1" will continue and those which sent a "0" will cease. In the illustrated example, since both slaves A and B received back their first "1" they proceed to transmit their respective second bits in bit period 3, which in this case are both a "0". Accordingly this "0" is echoed back by the master in bit period 4 and the two slaves continue with.the transmission of their next respective bits.

The third bits of slaves A and B differ, however, so that in bit period 5 the master receives a signal in both halves of the period. This it recognizes as a clash and in accordance with the above rules reads this transmission as a "1" and transmits back a "1" in bit period 6. Slave A recognizes this as the same value as it transmitted in the preceding bit period and accordingly proceeds with the transmission of its final bit. Slave B, however, does not recognize this as the same value as it transmitted in the preceding bit period and accordingly it ceases transmission. Since the only value which the master received in bit period 7 was a "0" it accordingly echoes this back in bit period 8.

At the end of eight bit periods, therefore, the master will have received, and echoed back, the complete identification code of slave A. Having read this code the master issues a confirmation signal. This is interpreted by all the other slaves in range as a fresh invitation to commence transmitting their identification codes—which in the case of the illustrated example proceeds for slave B as shown in the second block of eight bit periods. Slave A, however, having had its complete message echoed back by the master knows that it has accomplished a successful exchange and remains silent for the remainder of the session; otherwise, of course, its message would again be read in preference to that of slave B. When slave B's message has itself been received and echoed back by the master it issues another confirmation signal. If there are no other slaves in range the master considers the session to be closed and thereafter issues a fresh invitation signal, whereupon the whole process is repeated with whatever slaves are then in range. To avoid unnecessary repetition of identification codes from a slave to the same master in successive sessions the slaves may be programmed not to retransmit to the same master within a predetermined time from its last complete transmission, the invitation codes from different masters themselves being coded to enable a slave to identify when it moves into range of a new master.

Figure 3:
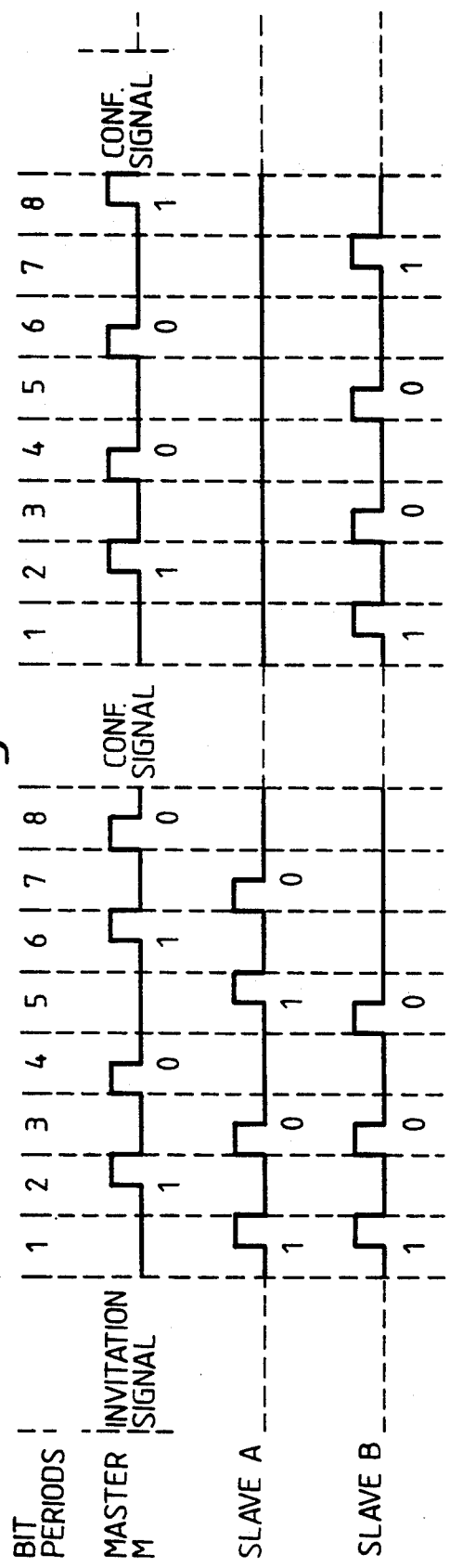
FIG. 3 is a transmission diagram of the data exchange occurring in the example of FIG. 2.

The example depicted in FIG. 3 is of course a very simple illustration of a system in accordance with the invention. In other situations and embodiments of the invention there may be a large number of potential slaves communicating with a master in any one session, each having an identification code comprising many more bits than four. The principles by which the protocol proceeds to resolve clashes between a greater number of longer slave messages remains precisely the same, however. Generally stated, with a series of slaves each wishing to transmit a different message N bits long, the above protocol ensures that after 2N bit periods the master will have received that message which, expressed as a binary number, is the largest; furthermore, the slave which sent that message will have had it echoed back from the master and will therefore know that it has been received successfully; during the next 2N bit periods the master will receive and echo back the message which is the next largest; and so on. In a practical embodiment each bit period may occupy approximately one millisecond, so that a communication session involving 10 slaves each with a message of, say, 88 bits long, together with the various invitation and confirmation signals, may take in the region of two seconds.

The system as so far described can be refined in several ways. Thus for example, let the invitation message from the master which initiates transmissions from the slaves contain a bit field large enough to represent a number from 0 to N−1, where N is the length of each slave message. The significance of this field is that if it represents the binary number M, then slave transmissions should start at bit M (the first bit being bit zero). The procedure starts as previously described, with M being set to zero. The master notes the bit number where the first clash occurs (i.e. a "0" and a "1" simultaneously received). Following successful reception of the first slave's message, the master then sends another initial message (confirmation signal) with M set equal to this value. It already knows that the bits 0 to M−1 of the messages from all the slaves were the same, and so can copy those from the message it has already received. It receives bits from M to N−1 as before, so receiving another slave's message after 2(N-M) bit periods. The procedure is then repeated until all messages have been received. The total time to receive all slave messages is much reduced by this scheme if the messages are long but only differ in the last few bits - which may be the case for identification codes in an access control system.

A variation of this is to note the bit position of the last clash, and to start retransmission from this point. If there are clashes in this attempt, the next start is made from the last clash. If not, the location of the most recent unresolved clash is used. This could be more efficient still, although requires more complex software.

Figure 4:
FIG. 4 illustrates a modified transmission scheme.

With infra-red transmission particularly, continuous signals may be hard to detect due to interference from ambient light. To overcome this, a pulsed message could be sent rather than transmitting continuously for half of the bit period, as indicated in FIG. 4. Of course, many more than four pulses could be used.

If a long (or variable length) message is to be sent, the protocol can be refined by defining periods when the above scheme for resolving clashes is employed, and periods during which only a specific slave may transmit (and so there can be no clashes). These periods can be defined by the master, possibly in response to the initial message from a slave. Similarly, periods can be defined when the master is transmitting messages which are neither invitations for the slaves to transmit nor echoes of messages from the slaves. If this is done, care must be taken that these messages cannot be mistaken for invitations, for example by suitable encoding of the invitations.

An alternative method for sending variable length messages from a slave to the master is for the slave to cease transmitting after it has completed its message, and for the master to recognize this absence of a signal as indicating the end of the message.

Messages may contain a parity bit or checksum, to protect against errors in transmission. Alternatively (or in addition), a slave may have to send its message a number of times, with a certain number of successful receptions being necessary before the message is accepted by the master. As an alternative to this, data within the message could be protected by an error-correcting code such as the Golay code.

As a security feature, messages from the slaves could contain a bit field which is generated from the identification code of the individual slave and a message sent periodically by the master. The master would change this message from time to time. This would protect the system against compromise through the recording and retransmission of messages from a slave.

We claim:

1. A method of data communication between a master transceiver and a plurality of slave transceivers, each slave transceiver having a respective message comprising a plurality of successive bits for transmission to the master transceiver in accordance with a code in which binary values are represented by a specified logic level occurring during a first portion or a second portion of a bit period respectively; the method comprising: synchronizing the operation of the master and slave transceivers such that in response to an instruction from the master transceiver said slave transceivers transmit the first bit of their respective messages simultaneously and transmission then alternates between the master and slave transceivers; the master transceiver transmitting back to the slave transceivers a binary value corresponding to the value last received when it receives a signal corresponding to the transmission of only a single binary value, from any number of said slave transceivers, in the preceding bit period, and transmitting back to the slave transceivers a predetermined single binary value when it receives a signal corresponding to the transmission of both binary values in the preceding bit period; each slave transceiver transmitting the next successive bit of its respective message when the last binary value received from the master transceiver corresponds to the preceding bit of its message, but ceasing transmission until a subsequent instruction is received from the master transceiver when the last binary value received from the master transceiver does not correspond to the preceding bit of its message; and each slave transceiver ceasing transmission in response to the reception from the master transceiver, through the aforesaid alternating transmission, of a message corresponding to the message transmitted by the respective slave transceiver.

2. A method according to claim 1 for communication between said slave transceivers and a plurality of said master transceivers, each slave transceiver ceasing transmission for a specified period of time following the reception from a first master transceiver of a message corresponding to the message transmitted by the respective slave transceiver, unless a subsequent instruction is received from a further said master transceiver for all slave transceivers to commence transmission.

3. A method according to claim 1 wherein the master transceiver, following the reception of a complete message from a slave transceiver during which a signal corresponding to the transmissio of both binary values was received during one or more bit periods, transmits an instruction for the remaining slave transceivers to recommence transmission of their messages from a bit corresponding to the earliest of said bit periods during which both binary values were previously transmitted.

4. A method according to claim 1 wherein the master transceiver, following the receptioin of a complete message from a slvae tansceiver during which a signal corresponding to the transmission of both binary values was received during one or more bit periods, transmits an instruction for the remaining slave transceivers to recommence transmissino of their messages from a bit corresponding to the most recent of the said bit periods during which both binary values were previously transmitted.

5. A method according to claim 1 wherein each said transceiver transmits binary message bits by the emanation of intra-red radiation above a predetermined amplitude threshold during a first portion or a second portion of a bit period respectively.

6. A method of personnel location incorporating a method of data communication acording to any preceding claim, wherein a plurality of said master transceivers are distributed within a building, each with a respective range for communication with slave transceivers, and a plurality of said slave transceivers are carried by respective individuals within the building and transmit respective identification codes corresponding to respective said individuals; each said master transceiver signalling to a monitoring station the respective identification codes transmitted to the master transceiver from the slave transceivers within its said range.

7. A method of access control incorporating a method of data communication acording to any one of claim 1 to 5, wherein a plurality of said master transcievers are associated with respective doorways within a building, each with a respective range for communication with slave transceivers, and a plurality of slave transceivers are carried by respective idividuals within the building and transmit respective authorization codes corresponding to respectie said individuals; each said master transceiver controlling access through the respective associated doorway in accordance with the level of authorization associated with the codes transmitted to the master transceiver from the salve transceivers within its said range.

* * * * *